United States Patent
Yamaguchi et al.

(10) Patent No.: US 9,628,998 B2
(45) Date of Patent: *Apr. 18, 2017

(54) WIRELESS COMMUNICATION NETWORK SYSTEM

(71) Applicant: THE NIPPON SIGNAL CO., LTD., Tokyo (JP)

(72) Inventors: Terufumi Yamaguchi, Kuki (JP); Yuhei Otsuka, Kuki (JP); Toshihito Shirai, Kuki (JP); Hideyuki Kato, Kuki (JP); Masahide Takahashi, Kuki (JP); Hiroshi Ogihara, Kuki (JP)

(73) Assignee: THE NIPPON SIGNAL CO., LTD., Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 14/180,321

(22) Filed: Feb. 13, 2014

(65) Prior Publication Data

US 2014/0161022 A1 Jun. 12, 2014

Related U.S. Application Data

(63) Continuation of application No. PCT/JP2012/070666, filed on Aug. 14, 2012.

(30) Foreign Application Priority Data

Aug. 15, 2011 (JP) .................................. 2011-177644

(51) Int. Cl.
*H04W 84/00* (2009.01)
*H04W 16/26* (2009.01)
(Continued)

(52) U.S. Cl.
CPC ......... *H04W 16/26* (2013.01); *B61L 15/0036* (2013.01); *B61L 27/0005* (2013.01);
(Continued)

(58) Field of Classification Search
None
See application file for complete search history.

(56) References Cited

U.S. PATENT DOCUMENTS 5,420,883 A * 5/1995 Swensen ................ B61L 3/125
342/450
2008/0298474 A1 * 12/2008 Charbit .............. H04B 7/15592
375/241

(Continued)

FOREIGN PATENT DOCUMENTS

EP 2763474 A1 8/2014
JP 2000-115193 A 4/2000
(Continued)

OTHER PUBLICATIONS

Japanese Office Action dated Apr. 21, 2015, which issued in Japanese Application No. 2011-177644, with its English language translation.
(Continued)

*Primary Examiner* — Hassan Phillips
*Assistant Examiner* — Ayanah George
(74) *Attorney, Agent, or Firm* — McDermott Will & Emery LLP

(57) ABSTRACT

A wireless communication network system including: mobile radios mounted on a moving body moving along a predetermined route; and a plurality of immobile radios arranged along the route, adjacent immobile radios wirelessly communicating with each other, to transmit information from a transmission source to a terminal by relaying the information. The mobile radios and the immobile radios communicate with each other by a time division multiple access method, in which time synchronization is performed to allow each of the mobile radios and the immobile radios to communicate in an allocated time slot. The mobile radios are disposed on front and rear parts of the moving body and (Continued)

are capable of communicating with each other. When the moving body is between the immobile radios arranged to be capable of wirelessly communicating with each other, the two mobile radios is capable of relaying information propagation between the immobile radios.

12 Claims, 9 Drawing Sheets

(51) Int. Cl.
    H04B 7/26      (2006.01)
    B61L 15/00     (2006.01)
    B61L 27/00     (2006.01)
    H04B 7/155     (2006.01)
    H04W 88/04     (2009.01)
    H04W 4/04      (2009.01)

(52) U.S. Cl.
    CPC ....... *H04B 7/15507* (2013.01); *H04B 7/2606* (2013.01); *H04W 4/046* (2013.01); *H04W 88/04* (2013.01); *H04W 84/005* (2013.01)

(56) References Cited

U.S. PATENT DOCUMENTS

| | | | |
|---|---|---|---|
| 2011/0238242 A1* | 9/2011 | Nichter | B61L 27/0005 701/19 |
| 2012/0136514 A1* | 5/2012 | Noffsinger | H04W 84/005 701/19 |

FOREIGN PATENT DOCUMENTS

| | | |
|---|---|---|
| JP | 2002-012150 | 1/2002 |
| JP | 2004-112142 A | 4/2004 |
| JP | 2008-062874 | 3/2008 |
| JP | 2008-062874 A | 3/2008 |
| JP | 2009-005240 A | 1/2009 |
| JP | 2009-225135 | 10/2009 |
| JP | 2010-087912 | 4/2010 |
| WO | WO-2005/081558 A1 | 9/2005 |

OTHER PUBLICATIONS

Taiwanese Office Action dated Jun. 27, 2016, which issued in Taiwan Application No. 101129419, and English language translation thereof.

\* cited by examiner

WIRELESS COMMUNICATION NETWORK SYSTEM

CROSS-REFERENCE TO RELATED APPLICATION

This application is a continuation application of PCT/JP2012/070666, filed on Aug. 14, 2012.

BACKGROUND OF THE INVENTION

1. Field of the Invention

The present invention relates to a wireless communication network system including mobile radios mounted on a moving body and a plurality of immobile radios which is spatially separated and arranged along a moving route of the moving body and transmits information by sequentially relaying the information, in which these radios communicate by a time division multiple access method, and more specifically, relates to a wireless communication network system that can reliably relay the information to maintain a network even in a situation in which a communication failure may be likely to occur between immobile radios arranged to be capable of wirelessly communicating with each other, and moreover, the wireless communication network system that can be realized at lower cost.

2. Description of Related Art

As this type of a conventional wireless communication network system, there is a wireless communication network system applied to control trains moving along railroad tracks, for example, as disclosed in Japanese Laid-open Patent Application Publication No. 2002-12150. The wireless communication network system as disclosed in Japanese Laid-open Patent Application Publication No. 2002-12150 is provided with: two train radios (mobile radios) mounted on front and rear parts of a train moving along a railroad track and wirelessly communicating while moving; a plurality of wayside radios (immobile radios) that is spatially separated at a predetermined distance and arranged along the railroad track and each of which wirelessly communicates with an adjacent wayside radio, to sequentially relay information to transmit the information; and one control station that is connected to one of the plurality of wayside radios by a wired cable and that controls and manages communication between the plurality of wayside radios and the train radios, each of the train radios and the wayside radios performing the communication by the time division multiple access method, in which time synchronization is performed to allow each of the train radios and the wayside radios to communicate only in an allocated time slot. The wireless communication network system having such a construction is controlled in a manner in which one transmission can be done in T/N (ms), i.e., time obtained by dividing one period T (ms) by N. N is the number of time slots.

An operation of the wireless communication network system of the time division multiple access method disclosed in Japanese Laid-open Patent Application Publication No. 2002-12150 will be briefly described. It is assumed that each wayside radio is arranged at a distance interval which allows the wayside radio to receive information transmitted by an adjacent wayside radio.

A control command with respect to a train generated in a control station SC is transmitted to a first wayside radio via the wired cable. The first wayside radio wirelessly transmits the received control command to a second wayside radio upon arrival of a time of a time slot for transmission allocated to the first wayside radio, and the second wayside radio receives the control command in the same time slot. The second wayside radio wirelessly transmits the received control command to a third wayside radio adjacent thereto upon arrival of a time of a time slot for transmission allocated to the second wayside radio. Thereafter, transmission and reception are similarly performed between the wayside radios, to sequentially relay information until the information arrives at a terminal wayside radio in a control area of this network. During this relay operation of the information, when a train is at a position in which a radio wave of a wayside radio reaches, a train radio mounted on the train receives information transmitted from the closest wayside radio, and when the received information includes a control command addressed to the train radio, the train radio receives the control command, so that an in-vehicle device controls traveling of the train according to the received control command.

Each train radio transmits information from the train upon arrival of a time of a time slot for transmission allocated to the train radio. The train information is received by a wayside radio closest to each train radio. The wayside radio, which has received the train information, transmits the received train information toward the control station upon arrival of a time of a time slot for transmission allocated to the wayside radio, so that the transmitted train information is sequentially relayed as described above in a time division manner by wayside radios existing between the transmitting wayside radio and the control station, and transmitted to the control station SC. Thus, a propagation direction of the information from the control station and that of the information from the train are opposite to each other, and accordingly, each wayside radio is allocated at least two time slots for the two directions.

In such a conventional wireless communication network system, since a propagation-type network, in which adjacent wayside radios sequentially perform wireless communication to relay information, is constructed, it may occur that, when this wireless communication network is used in a tunnel, for example, a gap between a train and the tunnel may be narrow, and accordingly, a radio wave may be attenuated as being propagated through the gap. Furthermore, when each antenna of each wayside radio is installed at a lower location than a train height, antennas of wayside radios in front of and behind a train may be blocked by the train, so that a radio wave may be unlikely to be received. When the wireless propagation path is thus inhibited and a communication failure occurs between wayside radios arranged to be capable of wirelessly communicating with each other, the wireless communication network may be disconnected at a location of the train.

In the propagation-type wireless communication network system disclosed in Japanese Laid-open Patent Application Publication No. 2002-12150, since the plurality of wayside radios and one control station are configured to be connected to each other by a wired network, such a problem, that is, the disconnection of the wireless communication network caused by a train, does not occur. However, in a case in which a control area of one wireless communication network is extremely wide, such as the train control, laying of wired communication paths for connecting the plurality of wayside radios requires capital investment relating thereto and continuous maintenance thereafter, resulting in a large burden in cost.

SUMMARY OF THE INVENTION

In view of the above problems, an object of the present invention is to provide a wireless communication network system that can reliably relay information and maintain a network even in a situation in which a communication failure may be likely to occur between immobile radios arranged to be capable of wirelessly communicating with each other, and moreover, that can reduce a burden in cost.

Therefore, according to an aspect of the present invention, a wireless communication network system includes:

mobile radios that are mounted on a moving body moving along a predetermined route; and a plurality of immobile radios that are spatially separated and arranged along the route, adjacent immobile radios wirelessly communicating with each other, to transmit information from a transmission source to a terminal immobile radio by relaying the information, in which the mobile radios and the immobile radios communicate with each other by a time division multiple access method, in which time synchronization is performed to allow each of the mobile radios and the immobile radios to communicate in an allocated time slot, in which the mobile radios are disposed on front and rear parts of the moving body and are capable of communicating with each other, in which when the moving body is between immobile radios, which are arranged to be capable of wirelessly communicating with each other, the two mobile radios mounted on the moving body is capable of relaying information propagation between the immobile radios.

In such a configuration, adjacent immobile radios wirelessly communicate with each other, to transmit information from a transmission-source immobile radio to a terminal immobile radio by relaying the information via intermediate immobile radios. The mobile radios mounted on the moving body moving along the predetermined route receives information addressed thereto from an immobile radio existing at a location capable of communicating with the mobile radios during the information relay of the immobile radios, and transmits its own information. The communication operations of the mobile radios and the plurality of immobile radios are performed by the time division multiple access method in which time synchronization is performed thereamong. Then, in a situation in which the information communication between the immobile radios arranged to be capable of wirelessly communicating with each other may be inhibited by the moving body, one of the front and rear mobile radios on the moving body, that is, the closer mobile radio closer to a transmitter immobile radio, receives information and transmits the received information to the other mobile radio, and then the other mobile radio wirelessly transmits it to a receiver immobile radio, to relay the information propagation between the immobile radios, using the two mobile radios of the moving body.

DESCRIPTION OF THE PREFERRED EMBODIMENTS

Hereinbelow, embodiments of the present invention will be described with reference to the accompanying drawings.

Figure 1:
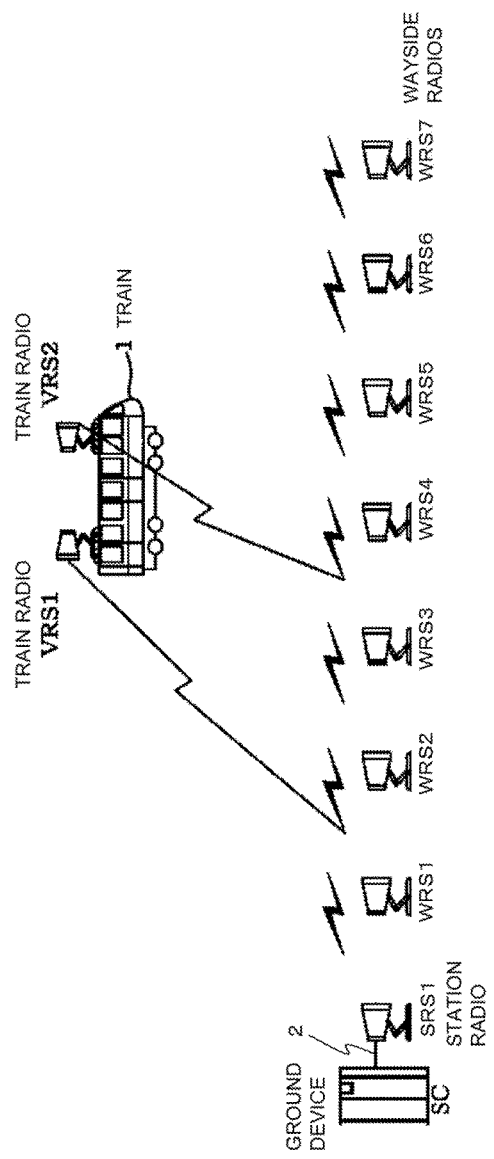
FIG. 1 is a schematic configuration view illustrating a wireless communication network system according to one embodiment of the present invention.

FIG. 1 is a schematic configuration view illustrating a wireless communication network system according to one embodiment of the present invention.

In FIG. 1, the wireless communication network system according to the present embodiment includes two train radios VRS1, VRS2 that are mounted on a train 1, that is a moving body, a station radio SRS1, a plurality of wayside radios WRS1-WRS7, and a ground device SC as a base station device.

The train radios VRS 1, VRS2 are disposed on front and rear parts of the train 1 and connected to an in-vehicle device (not illustrated) mounted on the train 1. The train radios VRS1, VRS2 are capable of communicating with each other, and for example, according to the present embodiment, the train radios VRS 1, VRS2 are connected by a wired cable in a manner capable of performing wired communication. In addition, the train radios VRS1, VRS2 wirelessly communicate various pieces of information with the plurality of wayside radios WRS1-WRS7 while moving, and accordingly, they correspond to mobile radios. In this case, it is assumed that the train radio VRS1 is disposed on the rear part of the train, and the train radio VRS2 is disposed on the front part of the train.

The station radio SRS1 is installed at a base station, for example, and it is connected to the ground device SC by a wired cable 2. Toward the wayside radios, the station radio SRS1 wirelessly transmits control information or a control command from the ground device SC to the train 1 or to the wayside radios, and from the wayside radios, the station radio SRS1 wirelessly receives information from the train 1 or the wayside radios to the ground device SC.

The wayside radios WRS1-WRS7 transmit to and receive from the train radios VRS1, VRS2 various information. The plurality of wayside radios WRS1-WRS7 is spatially separated and arranged along a railroad track which is a moving route of the train 1, and the plurality of wayside radios WRS1-WRS7 are propagation-type radios, in which adjacent wayside radios wirelessly communicate with each other to transmit information by relaying the information. Here, the station radio SRS1 and the wayside radios WRS1-WRS7 correspond to the immobile radios. The intervals between of these immobile radios are set to an interval such that a radio wave can reach the one after the next radio, for example.

The ground device SC controls and manages communication of the two train radios VRS1, VRS2, the station radio SRS1 and the plurality of wayside radios WRS1-WRS7 in this communication network, and includes a computer (CPU), for example.

Figure 2:
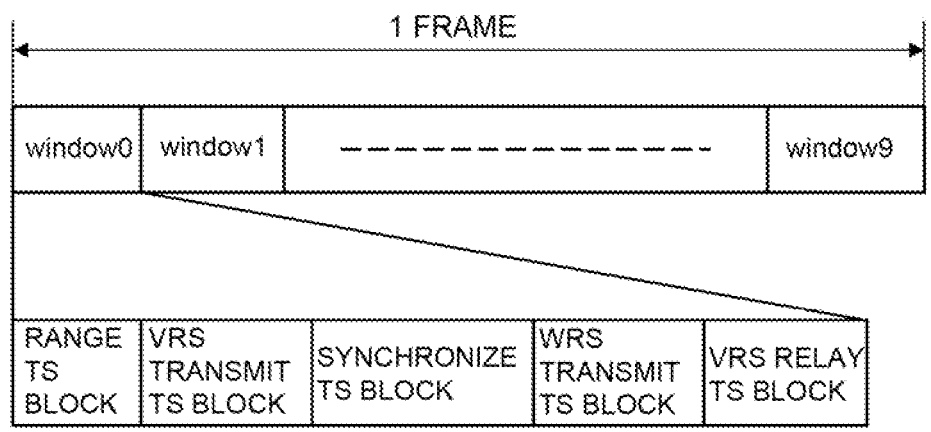
FIG. 2 is an explanatory view illustrating a frame structure in a communication operation period of the embodiment.

The communication control method of the wireless communication network system according to the present embodiment having such a configuration is a time division multiple access method (TDMA), so that information is transmitted from a transmission source radio to a terminal radio by relaying the information by intermediate radios. Furthermore, in a situation in which a communication failure is likely to occur between wayside radios arranged to be capable of wirelessly communicating with each other, such as in a tunnel, when the train 1 is between the wayside radios, information propagation between the wayside radios is performed by being relayed by the two train radios VRS1, VRS2 mounted on the train 1 according to a relay operation command from the ground device SC or the train radios VRS1, VRS2. The wireless communication network system according to the present embodiment periodically performs the communication operation with a period of one frame as illustrated in FIG. 2. In one frame, each radio is controlled to be capable of performing transmitting or receiving operations only in a predetermined time slot (hereinbelow, referred to as "TS") allocated by the ground device SC.

A structure of the frame will be briefly described.

One frame is divided into a plurality of, such as ten, windows W0-W9 (indicated as "window" in FIG. 2). Each of the windows W0-W9 is divided into a plurality of time slot blocks (hereinbelow, referred to as "TS blocks"), such as: a range TS block for measuring distance between the train radios VRS1, VRS2 and a communication target wayside radio WRS; a VRS transmit TS block, in which the train radios VRS1, VRS2 are transmission sources; a synchronize TS block for synchronizing transmitting and receiving operations of each radio; a WRS transmit TS block, in which the station radio SRS1 and the wayside radios WRS1-WRS7 are transmission sources; and a VRS relay TS block that is a relay time slot block for preforming a relay operation by the information transmission of the train radios VRS1, VRS2. Furthermore, each TS block is constituted by a predetermined number of TSs. Thus, by providing the VRS relay TS block, the information propagation between the wayside radios WRSs arranged to be capable of wirelessly communicating with each other can be relayed via the train radios VRS1, VRS2.

Next, a communication operation of the wireless communication network system according to the present embodiment will be described.

First, an ordinary information relay operation between the ground device SC and the train 1 in a section in which the wayside radios can normally communicate with each other will be described.

The ground device SC allocates to each train a window number for transmitting control information of a control target train, and the ground device SC allocates to each train a window number for transmitting train information from the train, and the ground device SC transmits the window numbers together with the control information for controlling the train to the station radio SRS1. Here, a transmission direction of the control information (hereinbelow, referred to as "+ direction", plus direction) and a transmission direction of the train information from the train 1 (hereinbelow, referred to as "− direction", minus direction) are opposite to each other, and accordingly, the window number for transmitting the control information has a + (plus) number while the window number for transmitting the train information has a − (minus) number, and thus, they differ in time from each other. Furthermore, regarding the allocation of the window number at which the train 1 transmits the train information, the window number at the earliest timing for the train 1 to transmit the train information is allocated by obtaining location relationships among trains and immobile radios based on location information and speed information of each train, which have already been obtained by the ground device SC, taking into account an information propagation time, and the like. This can decrease a transmission waiting time, and can increase information propagation efficiency.

The station radio SRS1, which has received information from the ground device SC, transmits the control information to the wayside radio WRS1, at a timing of arrival of the allocated window number for transmitting the control information, in a predetermined TS of the WRS transmit TS block in the window. Similarly, each of the intermediate wayside radios WRS1-WRS6 also transmits and relays the control information at a timing of arrival of the allocated window number, to thereby transmit the control information to the terminal wayside radio WRS7.

The train 1 receives, from the closest wayside radio thereto, the transmitted information, which was transmitted from the ground device SC and is being relayed and transmitted between the wayside radios WRS1-WRS7, and then transmits the received information to the in-vehicle device when the received information is addressed to the train 1. Furthermore, at a timing of arrival of a window number allocated to the train 1 to transmit the train information, the train 1 transmits the train information in a predetermined TS of the VRS transmit TS block in the window, and a wayside radio which has received the train information relays the train information in an opposite direction to the propagation direction of the control information from the ground device SC, to transmit the train information to the ground device SC.

Figure 3:
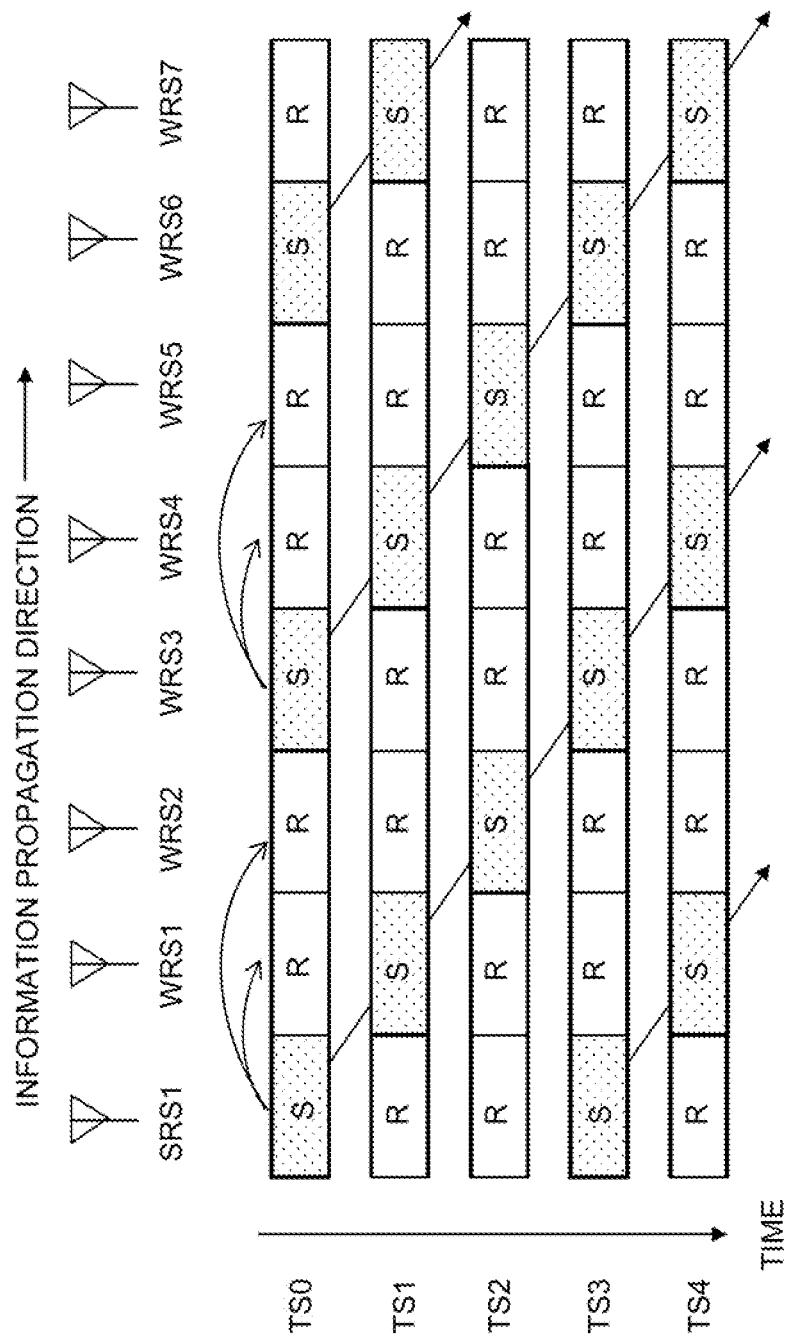
FIG. 3 is an explanatory view illustrating an example of a relay operation of control information from a ground device toward a train.

FIG. 3 illustrates an example of the relay operation of the control information from the ground device SC toward the train 1 transmitted in the WRS transmit TS block in a case in which one station radio and seven wayside radios are provided. In this case, the radio wave is assumed to reach one after the next radio from a transmission source radio.

In FIG. 3, at TS0, the station radio SRS1, as the transmission source, transmits (indicated as "S" in the figure) control information, and the wayside radios WRS1, WRS2 receive (indicated as "R" in the figure) the control information. At the next TS1, the wayside radio WRS1 transmits the received control information transmitted from the station radio SRS1, and the wayside radios WRS2, WRS3 receive the control information. At the next TS2, the wayside radio WRS2 checks the received control information transmitted from the station radio SRS1 and that from the wayside radio WRS1. When the two pieces of control information are the same, the wayside radio WRS2 determines that the control information is proper, and transmits the control information, and the wayside radios WRS3, WRS4 receive the control information. At the next TS3, the station radio SRS1 transmits new control information, and the wayside radios WRS1, WRS2 receive the new control information. In this manner, the control information transmitted from the station radio SRS1 is transmitted to the terminal wayside radio WRS7 by being relayed by the intermediate wayside radios WRS1-WRS6. Furthermore, since the station radio SRS1 regularly transmits control information, such as every three TSs, the station radio SRS1 and each of the wayside radios WRS1-WRS7 perform the same operation at intervals of three TSs. The control information transmitted from the station radio SRS1 every three TSs may be varied, or the same information may be transmitted multiple times to enhance reliability of the information. Furthermore, since each radio is located so that the next and one after the next radios therefrom can receive control information, unless the next and the one after next radios fail at the same time, the network system may not go down, resulting in the ensured normal communication and the improved reliability of the wireless communication network system. In this case, FIG. 3 illustrates an example of the information propagation from the ground device SC toward the train 1. However, as described above, since the train information is required to be transmitted from the train 1 to the ground device SC, that is, in the opposite direction, the station radio SRS1 and each of the wayside radios WRS1-WRS7 are allocated two TSs, that is, one for transmitting the control information from the ground device SC and the other for transmitting the train information from the train 1, in the same window number. Thus, actually, the station radio SRS1 and each of the wayside radios WRS1-WRS7 repeat the same operation at intervals of six TSs.

Furthermore, for example, each three radios are grouped as one (radio group surrounded by a thick line in FIG. 3), and the ground device SC allocates one window number illustrated in FIG. 2 to each group. That is, when the number of windows is ten, the windows are assigned to W0-W9, for example, as illustrated in FIG. 2. By specifying the window number, radios in each group perform a transmitting operation in a predetermined TS of the WRS transmit TS block in the specified window number at a timing of arrival of the allocated window number. Furthermore, by setting four frequencies f1-f4, for example, and by allocating them to consecutive window numbers, respectively, the frequencies used in adjacent window numbers can differ from each other, so that interference can be prevented.

Figure 4:
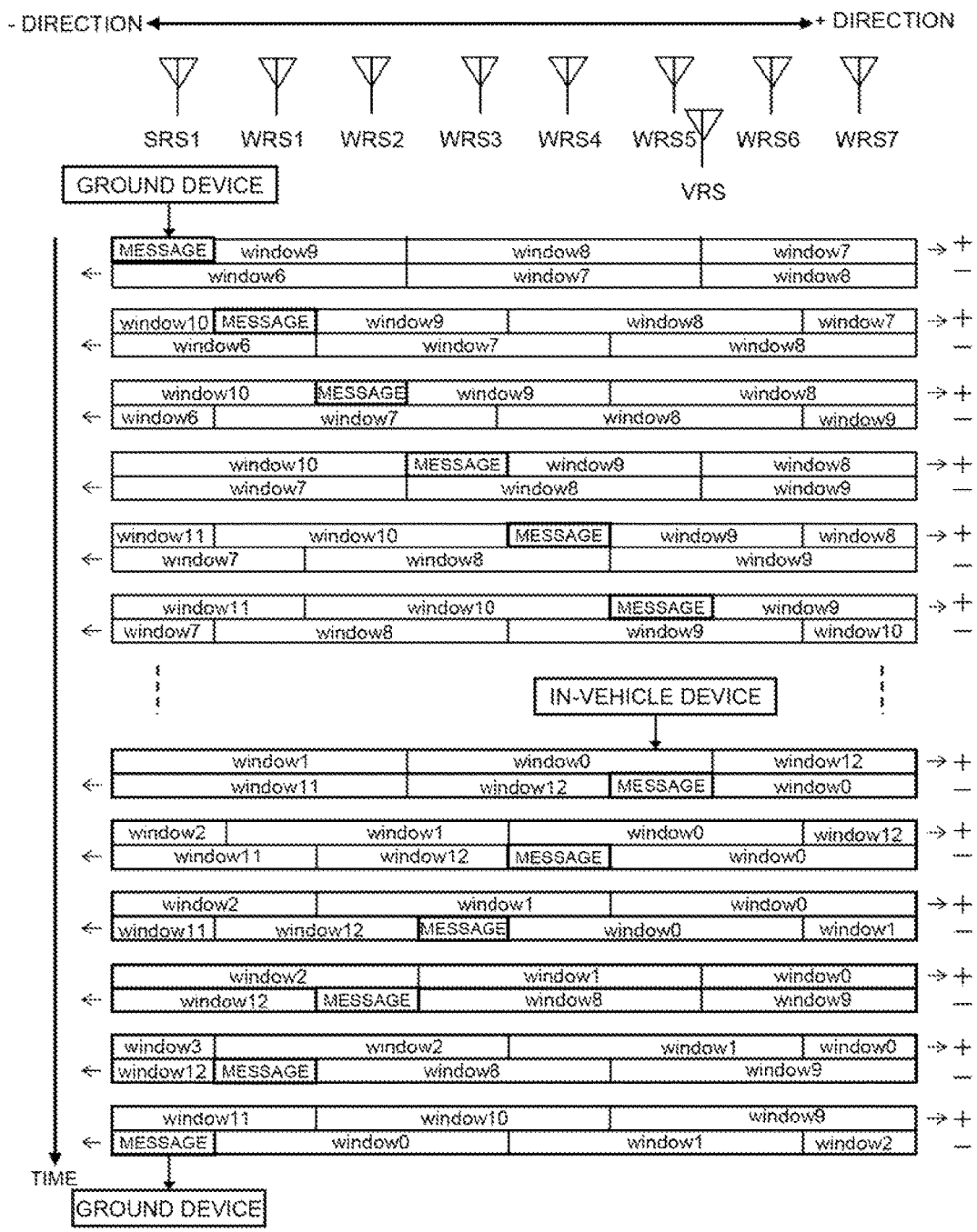
FIG. 4 is an explanatory view illustrating an example of information propagation between the ground device and the train.

FIG. 4 illustrates an example of information propagation between the ground device and the train. In this case, FIG. 4 illustrates an example in which the number of windows in one frame is assumed to be 13, and the train 1 is assumed to exist on a track between the wayside radios WRS5 and WRS6, and the ground device SC allocates the window 9 to transmit the control information to the train 1 while allocating the window 12 to the train 1 to transmit the train information. Here, the control information from the ground device SC is relayed rightward (in the + direction) in FIG. 4, and the train information from the train is relayed leftward (in the − direction) in FIG. 4, and thus, the relay directions are opposite to each other. Thus, as described above, the station radio SRS1 and each of the wayside radios WRS1-WRS7 are allocated two TSs for transmitting information, that is, one in the + direction and the other in the − direction, and regarding the window numbers, a window number in the + direction is specified to transmit the control information from the ground device SC to the train 1 and a window number in the − direction is specified to transmit the train information from the train 1 to the ground device SC. Thus, in FIG. 4, the specified window number for transmitting the control information from the ground device SC to the train 1 is the window number W9 in the + direction, while the specified window number for transmitting the train information from the train 1 to the ground device SC is the window number W12 in the − direction.

As is apparent from FIG. 4, as information propagates, the window numbers W0-W12 are shifted in a manner in which the window numbers in the + direction are shifted in the + direction and the window numbers in the − direction are shifted in the − direction. In this manner, the window numbers allocated to the station radio SRS1 and each of the wayside radios WRS1-WRS7 are shifted, so that the control information and the train information are relayed and transmitted. One repeat period of the window numbers allocated to the station radio SRS1 and each of the wayside radios WRS1-WRS7 corresponds to one frame. Thus, the one frame becomes one propagation period of the control information from the ground device SC to the train 1 and one propagation period of the train information from the train 1 to the ground device SC.

Next, a relay operation of information using train radios, which is a feature of the wireless communication network system of the present invention, will be described.

In the wireless communication network according to the present embodiment, the ground device SC, for example, determines, based on location information and speed information provided by a train, that the train is in a section in which wireless communication between wayside radios arranged to be capable of wirelessly communicating with each other may be inhibited by the existing train, such as in a tunnel, the ground device SC transmits a relay operation command instructing to use train radios. Then, based on the command transmitted from the ground device SC, information is relayed in the VRS relay TS block in the frame illustrated in FIG. 2, by using the two train radios VRS1, VRS2 mounted on the front and rear parts of the train 1. The transmission of the relay operation command for using the train radios VRS1, VRS2 of the train 1 may be mainly performed by the train, instead of the ground device SC. For example, the train radio VRS1 or VRS2 mounted on the train may obtain location information and/or speed information from the train thereof and other trains therearound, or may previously hold location information of each wayside radio, to transmit the command based on the information.

Figure 5:
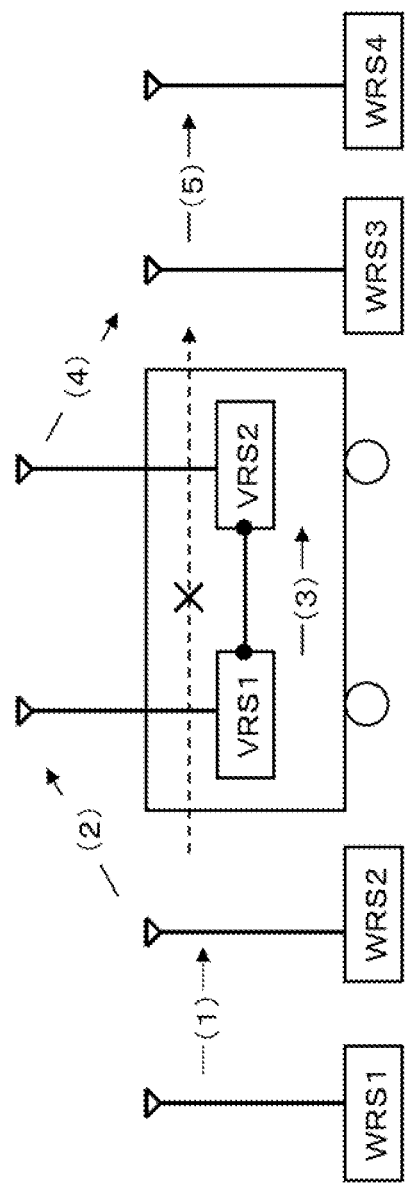
FIG. 5 is a view illustrating an outline of an information relay operation performed by train radios.

FIG. 5 is a view illustrating an outline of the relay operation performed by train radios VRS1, VRS2 when the control information is transmitted from the ground device SC. In this case, the train 1 is assumed to move rightward in the figure. Information transmitted from the wayside radio WRS1 toward the wayside radio WRS2 is propagated in the order of the wayside radio WRS1, the wayside radio WRS2, the train radio VRS1, the train radio VRS2, the wayside radio WRS3, and the wayside radio WRS4, as illustrated in the figure as (1), (2), (3), (4), and (5) in this order. The information is transmitted from the train radio VRS1 to the train radio VRS2 via the wired cable.

Figure 6:
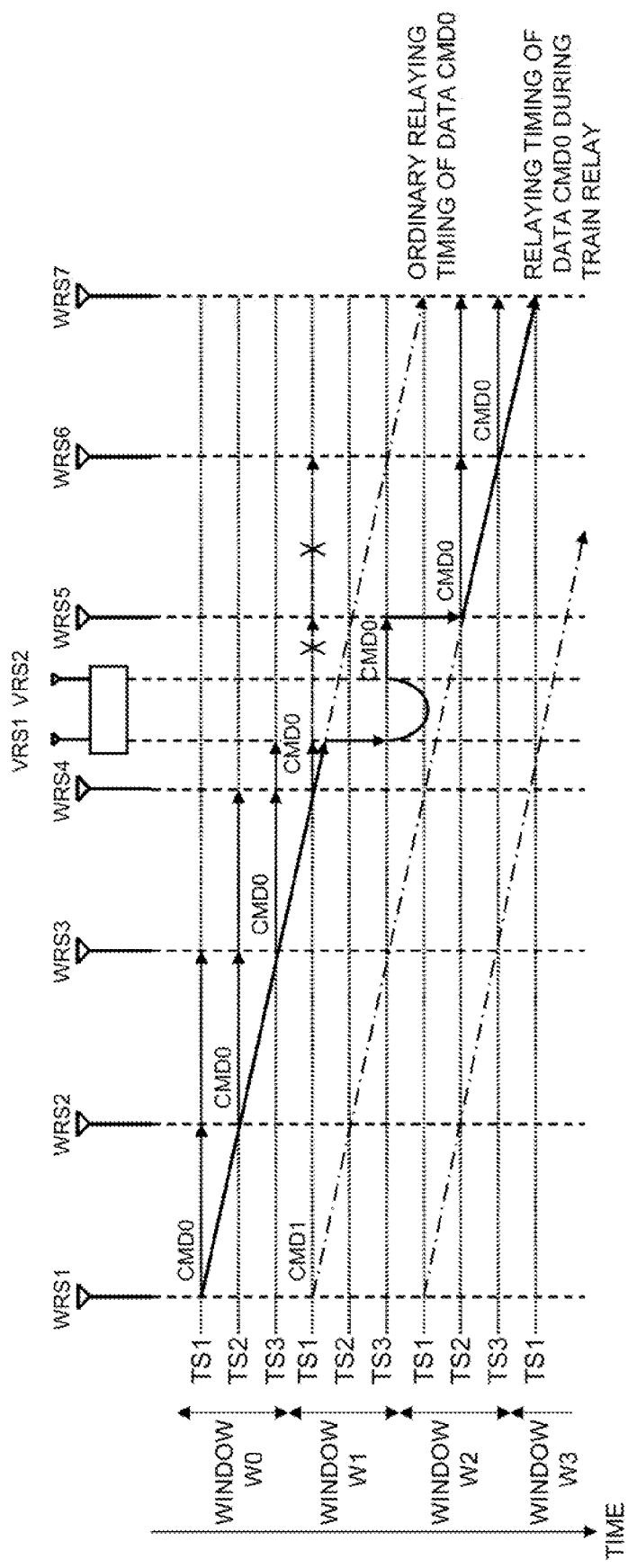
FIG. 6 is an explanatory view illustrating a relay-operating timing of information performed by the train radios.

FIG. 6 is a view illustrating a relay operation timing when the train radios are used.

The relay operation in a case in which the train radios are used will be specifically described with reference to FIG. 6. FIG. 6 illustrates an example in which the train 1 is between the wayside radios WRS4 and WRS5 arranged to be capable of wirelessly communicating with each other. Each of the wayside radios WRS1-WRS7 transmits information every three TSs at the allocated window number for transmission in the + direction (rightward in the figure) in the WRS transmit TS block as described above, and the allocated window number is changed. When the train 1 does not exist between the wayside radios WRS4 and WRS5, each of data CMD0 transmitted from the wayside radio WRS1 in TS1 of the window W0 and data CMD1 transmitted in TS1 of the next window W1 is sequentially relayed and transmitted to the terminal wayside radio WRS7 at a transmitting timing as indicated by a chain line in the figure. As described above, the window number W is shifted with time, corresponding to a transmitting timing of each of the radios WRS1-WRS7. Thus, the data CMD0 is propagated in the window W0, and the data CMD1 is propagated in the window W1.

When the train 1 is between the wayside radios WRS4 and WRS5, the data CMD0 (data transmitted from the wayside radio WRS1 in the TS 1 of the window W0), which was transmitted at each transmitting timing of the wayside radios WRS3 and WRS4 and inserted in the window W0, is received by the train radio VRS 1. The train radio VRS1, which has received the data CMD0 from the wayside radio WRS4, transmits the data CMD0 to the train radio VRS2 via the wired cable in a predetermined TS in the window W0, and the train radio VRS2 wirelessly transmits the data CMD0 to the wayside radio WRS5 in the predetermined TS of the VRS relay TS block of the same window W0. The wayside radio WRS5, which has received the data CMD0 from the train radio VRS2, holds the data CMD0 until its own transmitting timing arrives, and at the own transmitting timing in the WRS transmit time slot block in the window W0, that is, at a timing for transmitting the next data CMD1 inserted in the window W1, the wayside radio WRS5 transmits the information CMD0 received from the train radio VRS2. Thus, when the relay operation of the information is performed by using the train radios, the information is transmitted with a delay of one window. Here, during the relay operation using the train radios VRS 1, VRS2, a transmission frequency of the wayside radio WRS4 and a reception frequency of the wayside radio WRS5 are set according to a reception frequency of the train radio VRS1 and a transmission frequency of the train radio VRS2, which are set by the relay operation command of the ground device SC. When the ground device SC specifies the reception frequency of the train radio VRS 1 and the transmission frequency of the train radio VRS2, a previously set frequency pattern is specified as described below.

Furthermore, in the wireless communication network system according to the present embodiment, when the relay control of information using the train radios VRS 1, VRS2 is executed in response to the relay operation command from the ground device SC, such as when the train 1 enters a tunnel, the ground device SC specifies each wayside radio, with which each of the train radios VRS 1, VRS2 communicates, according to an existing location of the train 1, and specifies frequency patterns for each of the train radios VRS1, VRS2 in which the train radios VRS1, VRS2 communicate with the wayside radios. As the frequency patterns, different frequency patterns are allocated to each train. However, the same communication frequency pattern is allocated to train radios in a section between two trains, that is, a rear train radio VRS 1 of a preceding train and a front train radio VRS2 of a following train. Here, as the frequency patterns, four patterns, for example, are set, and in each frequency pattern, four frequencies are sequentially switched at a predetermined time interval (for example, 0.5 seconds). Although each frequency pattern includes the same four frequencies, a switching order thereof is varied, so that frequencies of the frequency patterns at the same time are different from each other.

According to the wireless communication network system of the present embodiment, even when the wireless communication between wayside radios arranged to be capable of wirelessly communicating with each other may be inhibited by a train, such as in a tunnel, information can be transmitted between the wayside radios by using the train radios VRS1, VRS2 mounted on the train 1, so that the network can be maintained even if a communication failure occurs between the wayside radios, resulting in the reliable relay propagation of the information, and the improved reliability of the wireless communication network. Furthermore, since it is not necessary to lay wired communication paths for connecting a large number of wayside radios, the capital investment and the continuous maintenance thereafter are not required. Thus, even in a case in which a control area of one wireless communication network is extremely wide, such as in the train control, the burden in cost can be reduced.

Furthermore, there may be a case in which during the relay operation using the train radios, a wireless communication is performed between wayside radios, which are located on both sides of the train and arranged to be capable of wirelessly communicating with each other, skipping the train. FIG. 6 illustrates an example, in which information (for example, the data CMD0) transmitted from the wayside radio WRS4 is directly received by the wayside radio WRS5. In such a case, the wayside radio WRS5 redundantly receives the same data CMD0, and transmits the directly received data CMD0 at an ordinary transmitting timing, and transmits the same data CMD0 received from the train radio VRS2 with a delay of one window, as described above.

To prevent such a redundant propagation of the same data, the system may be configured so that a wayside radio, which has received a relay control command for using train radios, is controlled not to transmit the directly received data CMD0 during the relay control. For example, when a wayside radio, which has received the relay control command for using the train radios, receives data which can be transmitted at an ordinary transmitting timing, the wayside radio determines that the data is not the information delayed by the train radios, so that the wayside radio is operated not to transmit the received data in a predetermined TS allocated for transmission of the WRS transmit TS block. Furthermore, as an alternative system configuration for preventing the redundant propagation of the same data, the system may be configured so that a transmitting timing may be selected according to a propagation direction of information. That is, when control information is transmitted in the information transmitting direction from the ground device SC toward the train, and when the wayside radio receives data which can be transmitted at the ordinary transmitting timing, the wayside radio transmits the data without delay, whereas when the wayside radio receives the delayed data delayed by the train radios, the wayside radio determines that the data has been transmitted and does not transmit the data. Similarly to the above, when information is transmitted in the information propagation direction in which the train information is propagated from the train to the ground device SC, the wayside radio determines that the received data which can be transmitted at the ordinary transmitting timing is not the delayed information and does not transmit the data, and transmits it at a timing delayed by one window according to the relay control command.

Thus, during the relay control using the train radios VRS1, VRS2, the redundant propagation of the same data can be avoided, and the redundant information propagation operation can be avoided.

Furthermore, as described above, in the information relay control operation using the train radios, the relay operation of the train radios VRS 1, VRS2 causes the propagation of information to be delayed by one window in the information propagation after passing the train. In this case, as illustrated in FIG. 6, the transmitting timing of the data CMD1 inserted in the next window W1 may be overlapped at the wayside radio WRS5, and a data collision may occur.

Figure 7:
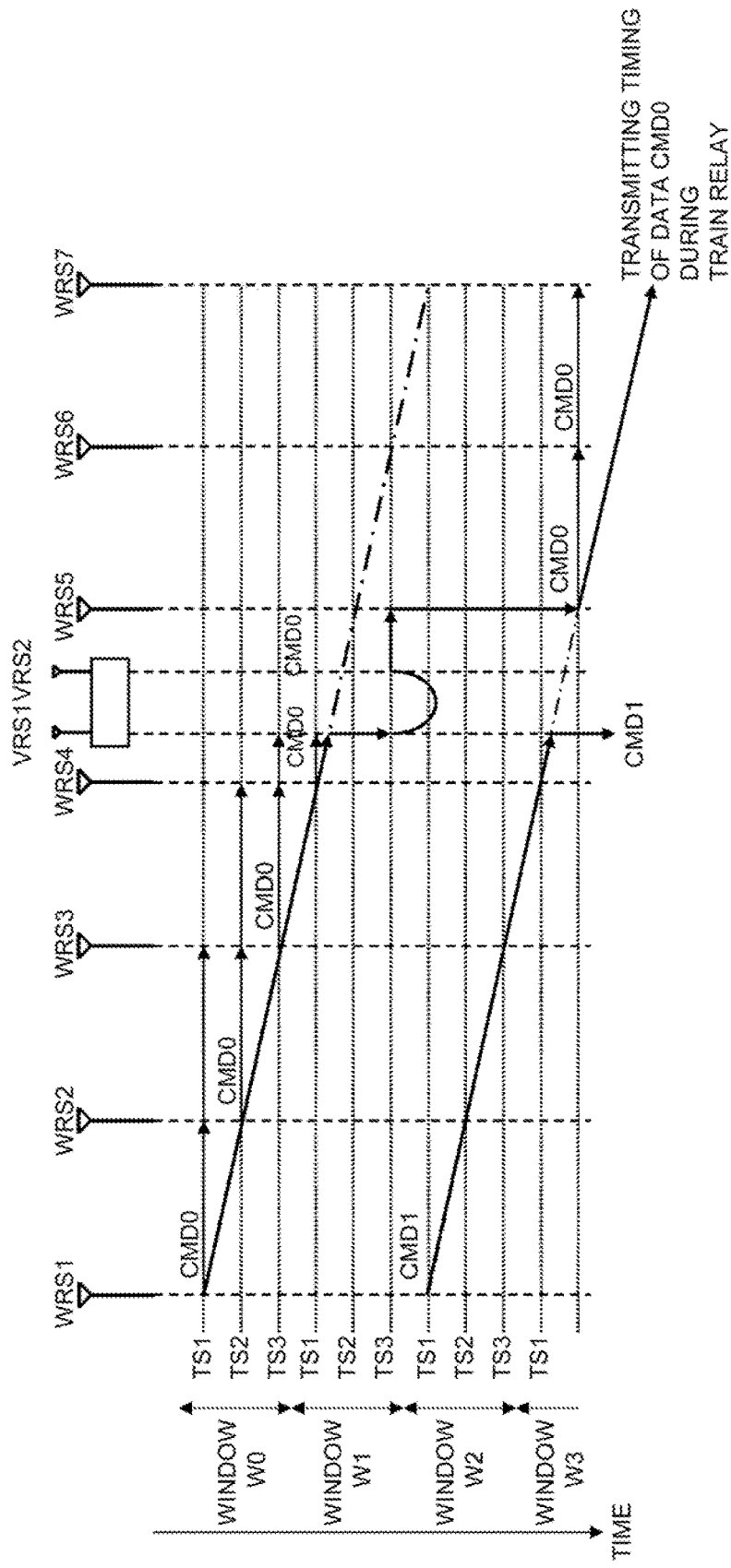
FIG. 7 is an explanatory view illustrating an information propagation control when a window in which transmission is permitted is specified.

To avoid such a data collision, for example, in a wayside radio which has received the relay control command for using the train radios, the system may be configured so that the ground device SC specifies, in the relay control command, a window in which each wayside radio is permitted to perform transmission, for example, and the wayside radio performs transmission only in the window in which the transmission is permitted. For example, alternate windows are specified as the window in which the transmission is permitted. An example of the transmitting operation according to such an information propagation control is illustrated in FIG. 7. FIG. 7 illustrates a case in which, in the relay control operation using the train radios, the windows W0 and W2 are specified for each of the wayside radios WR1-WR7 as the transmission permitted windows, and the window W1 is specified as a window in which the transmission is prohibited. In the case illustrated in FIG. 7, the wayside radio WRS5 which has received the data CMD0 from the train radio VRS2 does not transmit at a transmitting timing in the window W1 which is immediately after the reception and in which the transmission is not permitted, as illustrated in FIG. 6, whereas the wayside radio WRS5 transmits the received data CMD0 from the train radio VRS2 at a transmitting timing in the following window W2. In this case, similarly, a window in which data transmitted from the wayside radio WRS1 in the window W2 is to be transmitted is also shifted. Thus, the problem of information collision caused by the propagation delay of the information due to the relay control operation using the train radios can be prevented.

In the relay control operation using the train radios, the propagation delays by one window every one train. Thus, during the relay control using the train radios, in the information propagation from the ground device SC toward the train (+ direction in FIG. 4), each wayside radio calculates the number of windows, by which the propagation is required to be delayed, based on the number of trains existing between the ground device SC and the wayside radio, whereas in the information propagation from the train toward the ground device SC (− direction in FIG. 4), each wayside radio calculates the number of windows, by which the propagation is required to be delayed, based on the number of trains existing between the terminal wayside radio and the wayside radio, to thereby select a window number from the transmission permitted window numbers and transmit the information therein.

Furthermore, there may be a case in which several pieces of information are required to be transmitted even when the transmission is controlled by specifying the transmission permitted window numbers as described above. In such a case, transmission priority is previously decided, and information with higher priority, such as older information, is controlled to be preferentially transmitted, sequentially followed by other information with lower priority, in the transmission permitted window. For example, when windows assigned by even numbers are specified as the transmission permitted windows, information with the highest priority is transmitted in the window number W0, and then, information with the secondly highest priority is transmitted in the window number W2. At this time, the window number in which information was transmitted is stored, to prevent the information inserted in the same window number from being transmitted several times.

Figure 8:
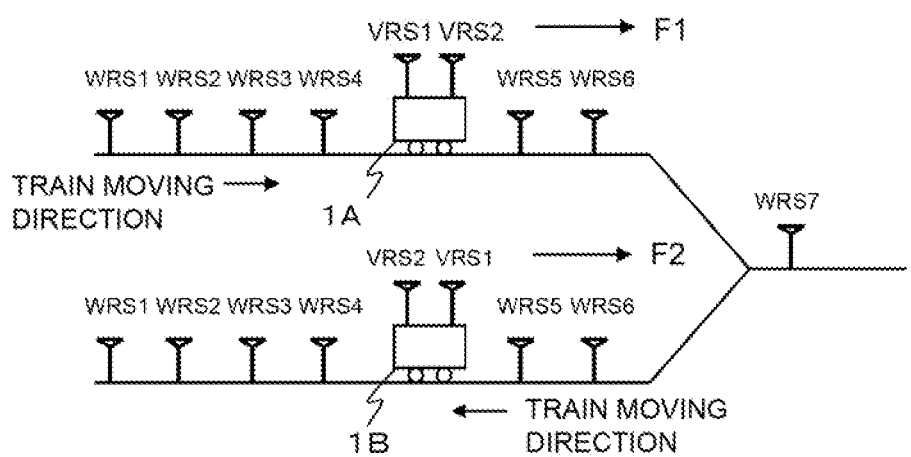
FIG. 8 is an explanatory view illustrating an example of a receiving operation of a wayside radio used in common in a plurality of train routes.

There may be a case in which when trains 1A and 1B are in the same section in their own train routes as illustrated in FIG. 8 (in FIG. 8, the trains 1A, 1B are in a section between the wayside radios WRS4 and WRS5 in their own train routes), a common wayside radio used in common in a plurality of train routes at an intersection, at which the plurality of train routes branch and join, receives information from both train routes at the same time. To prevent such simultaneous reception of information, in each of the train routes, different transmission permitted window number in the VRS relay TS block during the relay control using the train radios is set. Thus, when the train 1A (or the train 1B) transmits information, the train 1B (or the train 1A) does not transmit information, so that the common wayside radio WRS7 does not simultaneously receive the information of both train routes. In this case, the wayside radio WRS7 discriminates the window numbers allocated to the train 1A and the train 1B for transmitting the information, based on the relay control command, and is set to the frequency allocated to the window number and waits for reception. For example, in the example of FIG. 8, when it is a timing with the window number allocated to the train 1A to transmit the information, the wayside radio WRS7 waits for reception at a frequency F1, whereas when it is a timing with the window number allocated to the train 1B to transmit information, the wayside radio WRS7 waits for reception at a frequency F2.

Figure 9:
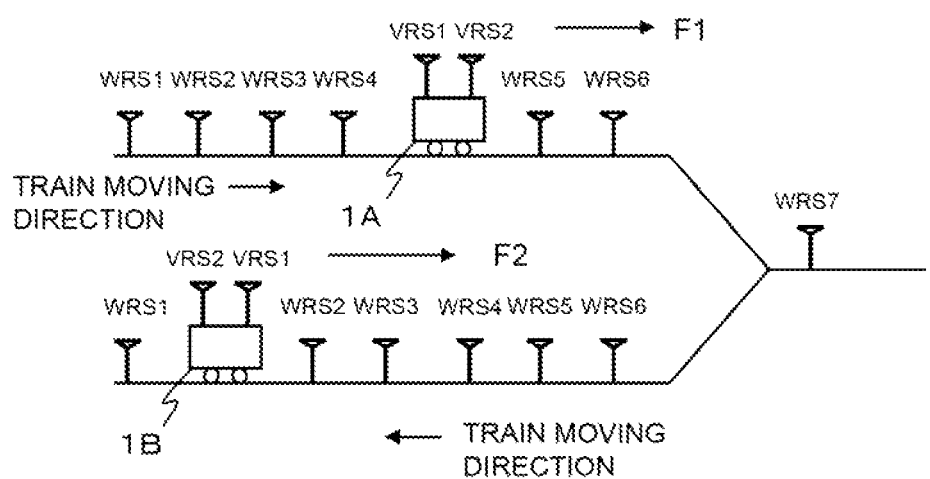
FIG. 9 is an explanatory view illustrating another example of the receiving operation of the wayside radio used in common in the plurality of train routes.

Furthermore, as illustrated in FIG. 9, when the trains 1A and 1B are in different sections in their own train routes (in FIG. 9, the train 1A is in a section between the wayside radios WRS4 and WRS5, and the train 1B is in a section between the wayside radios WRS1 and WRS2), the wayside radio WRS7 may obtain locations of the train 1A and the train 1B based on the relay control command, and may wait for reception while being set to a frequency allocated in the VRS relay TS block to the closer train. In the example of FIG. 9, the wayside radio WRS7 may wait for the reception while being set to the frequency F1 of the train 1A.

Thus, when there is the common wayside radio, which is used in common in the plurality of train routes at the intersection at which the plurality of train routes branch and join, the different window numbers at which the transmission is permitted may be specified for each of the plurality of train routes during the relay control using the train radios, so that the common wayside radio used in common in the plurality of train routes can be prevented from simultaneously receiving the information from the plurality of train routes.

In the present embodiment, the number of wayside radios has been described as seven; however, as is obvious to one skilled in the art, the number of employed wayside radios is not limited thereto, and the number of wayside radios may be increased and decreased according to a length of the control area of the moving body.

Furthermore, a communication mode between the train radios mounted on the front and rear parts of the train is not limited to the wired communication configuration in which the train radios are connected to each other by the wired cable as described in the present embodiment, and may be a wireless communication configuration.

According to the wireless communication network system of the present invention, the two mobile radios capable of communicating with each other are mounted on the moving body and disposed on the front and rear parts of the moving body, and when the moving body is between the immobile radios arranged to be capable of wirelessly communicating with each other, the two mobile radios of the moving body is capable of relaying the information propagation between the immobile radios. Thus, in a case in which the propagation of a radio wave between the immobile radios arranged to be capable of wirelessly communicating with each other is inhibited by the entering of the moving body, such as in a tunnel, the information propagation between the immobile radios can be relayed by using the mobile radios. Thus, the information propagation between the immobile radios arranged to be capable of wirelessly communicating with each other is unlikely to be blocked, and accordingly, the network can be maintained, and the reliability of the network can be improved. Furthermore, since it is not necessary to lay the wired communication paths for connecting the plurality of immobile radios (wayside radios), the burden in cost required for capital investment, maintenance, and the like, can be reduced.

It should be noted that the entire contents of Japanese Patent Application No. 2011-177644, filed on Aug. 15, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A wireless communication network system comprising:
   mobile radios that are mounted on a moving body moving along a predetermined route; and
   a plurality of immobile radios that are spatially separated and arranged along the route, adjacent immobile radios wirelessly communicating with each other, to transmit information from a transmission source to a terminal immobile radio by relaying the information,
   wherein the mobile radios include a first mobile radio disposed on a front part of the moving body and a second mobile radio disposed on a rear part of the moving body, and the first mobile radio and the second mobile radio are capable of communicating with each other,
   wherein when an information propagation between a first immobile radio and a second immobile radio of the plurality of immobile radios, which are capable of wirelessly communicating with each other, is inhibited by the moving body existing therebetween, information to be transmitted from the first immobile radio to the second immobile radio is relayed by both of the first mobile radio disposed on the front part of the moving body and the second mobile radio disposed on the rear part of the moving body, according to a transmission direction of the information to be transmitted from the first immobile radio to the second immobile radio.

2. The wireless communication network system according to claim 1, wherein the mobile radios and the immobile radios communicate with each other by a time division multiple access method, in which time synchronization is performed to allow each of the mobile radios and the immobile radios to communicate in an allocated time slot,
   wherein during one period of a communication operation of a communication network, as a relay communication time period for relaying the information to be transmitted from the first immobile radio to the second immobile radio by the first mobile radio and the second mobile radio, a relay time slot block including a plurality of time slots is provided,
   wherein when a relay operation command is generated, an information receiving operation in which either one of the first mobile radio and the second mobile radio receives information transmitted from the first immobile radio, a communication operation of the information from the either one of the first mobile radio and the second mobile radio to the other mobile radio, and an information transmitting operation in which the other mobile radio transmits the information to the second immobile radio, are performed in an allocated time slot in the relay time slot block in a time division manner.

3. The wireless communication network system according to claim 2, wherein the one period of the communication operation of the communication network is divided into a plurality of windows, which includes a plurality of time slots and is assigned consecutively, each of the windows being provided with the relay time slot block, the plurality of immobile radios being divided into groups such that a transmitter immobile radio and at least one immobile radio which is capable of receiving a radio wave from the transmitter immobile radio are grouped as one, each of the groups being allocated one window number, a repeat period of the window numbers being set to correspond to the one period of the communication operation, to thereby perform relay propagation of the information,
   wherein when receiving the relay operation command, the information receiver immobile radio transmits information only when the information receiver immobile radio is allocated a window number at which the transmission is permitted by the relay operation command.

4. The wireless communication network system according to claim 3, wherein the window numbers at which the transmission is permitted by the relay operation command are set to be alternate numbers.

5. The wireless communication network system according to claim 3 wherein when the moving route of the moving body includes a branch point or an intersection, at which a plurality of routes branch and join, the allocated window numbers allocated to the plurality of immobile radios arranged along each route, are varied for each route, in the relay time slot block.

6. The wireless communication network system according to claim 5, wherein the relay time slot block, an information reception frequency of a common immobile radio which is arranged at the branch point of the intersection and used in common in the plurality of routes for the information propagation is set to a frequency corresponding to a transmission frequency of a mobile radio of a closest moving body of the moving bodies existing on the routes.

7. The wireless communication network system according to claim 2, wherein when the immobile radio receives the relay operation command, an information reception frequency of the immobile radio in the relay time slot block is set to a frequency specified by the relay operation command, and the immobile radio waits for information transmitted from a mobile radio.

8. The wireless communication network system according to claim 2, wherein when it is determined that the moving body is in a section previously defined as a section in which communication between immobile radios is likely to be inhibited, based on a location information and a speed information of the moving body, the relay operation command is transmitted to each of the mobile radios of the moving body and immobile radios located in front of and behind the moving body.

9. The wireless communication network system according to claim 8, further comprising a base station device that is wired to one of the plurality of immobile radios, and that controls and manages communication between the immobile radios and the mobile radios,
   wherein the base station device determines that the moving body is in the section previously defined as the section in which communication between the immobile radios is likely to be inhibited, to transmit the relay operation command.

10. The wireless communication network system according to claim 8, wherein the mobile radio mounted on the moving body transmits the relay operation command based on a location information of the mobile radio mounted on the moving body, on a location information of another moving body, and on a location information of each immobile radio.

11. The wireless communication network system according to claim 1, wherein the first mobile radio and the second immobile radio are connected to each other by a wired cable to perform wired communication.

12. The wireless communication network system according to claim 1, wherein when the transmission direction of the information to be transmitted from the first immobile radio to the second immobile radio is a same direction as a moving direction of the moving body, the information to be transmitted from the first immobile radio to the second immobile radio is propagated in the order of the first immobile radio, the second mobile radio, the first mobile radio, and the second immobile radio.

\* \* \* \* \*